US009595736B2

(12) United States Patent
Homma et al.

(10) Patent No.: US 9,595,736 B2
(45) Date of Patent: Mar. 14, 2017

(54) LITHIUM-ION CONDUCTOR AND ALL-SOLID LITHIUM-ION SECONDARY BATTERY

(71) Applicant: FUJITSU LIMITED, Kawasaki-shi, Kanagawa (JP)

(72) Inventors: Kenji Homma, Atsugi (JP); Satoru Watanabe, Hiratsuka (JP); Tamotsu Yamamoto, Tachikawa (JP); Tsutomu Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 14/665,552

(22) Filed: Mar. 23, 2015

(65) Prior Publication Data
US 2015/0200421 A1 Jul. 16, 2015

Related U.S. Application Data

(63) Continuation of application No. PCT/JP2012/075971, filed on Oct. 5, 2012.

(51) Int. Cl.
*H01M 10/0525* (2010.01)
*H01M 10/0562* (2010.01)
*H01B 1/10* (2006.01)
*H01B 1/12* (2006.01)

(52) U.S. Cl.
CPC .......... *H01M 10/0562* (2013.01); *H01B 1/10* (2013.01); *H01M 10/0525* (2013.01); *H01B 1/122* (2013.01); *H01M 2300/0068* (2013.01)

(58) Field of Classification Search
CPC ..... H01B 1/10; H01B 1/122; H01M 10/0562; H01M 10/0525; H01M 2300/0068
See application file for complete search history.

(56) References Cited

U.S. PATENT DOCUMENTS

| 2005/0107239 | A1* | 5/2005 | Akiba | C03B 19/1005 501/40 |
|---|---|---|---|---|
| 2011/0171528 | A1* | 7/2011 | Oladeji | C23C 18/06 429/223 |
| 2013/0040208 | A1* | 2/2013 | Kanno | C01B 17/20 429/319 |
| 2014/0147753 | A1 | 5/2014 | Homma et al. | |
| 2014/0170493 | A1* | 6/2014 | Holme | H01M 4/04 429/220 |

FOREIGN PATENT DOCUMENTS

| EP | 1 466 865 | 10/2004 |
|---|---|---|
| JP | 2003-22707 | 1/2003 |
| JP | 2003-68361 | 3/2003 |
| JP | 2003-208919 | 7/2003 |
| JP | 2007-273214 | 10/2007 |
| JP | 2009-193803 | 8/2009 |
| WO | WO 2009/101506 | 8/2009 |
| WO | 2011/118801 A1 | 9/2011 |
| WO | 2012/026238 A1 | 3/2012 |
| WO | WO 2013/024537 | 2/2013 |

OTHER PUBLICATIONS

Patent Abstracts of Japan, Publication No. 2003-022707, published Jan. 24, 2003.
Patent Abstracts of Japan, Publication No. 2003-068361, published Mar. 7, 2003.
Patent Abstracts of Japan, Publication No. 2003-208919, published Jul. 25, 2003.
Patent Abstracts of Japan, Publication No. 2007-273214, published Oct. 18, 2007.
Patent Abstracts of Japan, Publication No. 2009-193803, published Aug. 27, 2009.
Kong, Shiao Tong, et al. "Structural Characterisation of the Li Argyrodites $Li_7PS_6$ and $Li_7PSe_6$ and their Solid Solutions: Quantification of Site Preferences by MAS-NMR Spectroscopy," *Chemistry—A European Journal* 16, (2010): pp. 5138-5147.
Kenji Homma et al. "Crystalline Phase and Lithium Ionic Conductivity Changed by Semimetal Element Substitution for $Li_3PS_4$", Proceedings of the 52nd Battery Symposium, Oct. 17, 2011, p. 241.
International Search Report of PCT/JP2012/075971, mailed Dec. 25, 2012.
Extended European Search Report dated Nov. 26, 2015 in corresponding European Patent Application No. 12886065.7.
Zhang et al., "Synthesis and Characterization of the $B_2S_3$-$Li_2S$, the $P_2S_5$-$Li_2S$ and the $B_2S_3$-$P_2S_5$-$Li_2S$ Glass Systems", Solid State Ionics, North Holland Publishing Company, vol. 38, No. 3-4, May 1, 1990, pp. 217-224.
XP-002746363, Database WPI, Week 201167, 2011, Thomson Scientific, London, AN 2011-M28910 & Wo 2011/118801 A1.
XP-002746364, Database WPI, Week 200812, 2008, Thomson Scientific, London, AN 2008-B64910 & JP 2007 273214 A.

\* cited by examiner

*Primary Examiner* — Muhammad Siddiquee
(74) *Attorney, Agent, or Firm* — Staas & Halsey LLP

(57) ABSTRACT

The lithium-ion conductor contains a crystal structure whose composition formula is represented by $Li_{7+2x}P_{1-x}B_xS_6$ ($0<x\leq1$). The crystal structure contains a $LiS_4$ tetrahedron and a $BS_4$ tetrahedron, a triangle window of the $LiS_4$ tetrahedron through which lithium ions pass becomes large caused by the $BS_4$ tetrahedron, and an ionic conductive path is expanded. Furthermore, lithium ions being a conductive carrier are added corresponding to B quantity x. Consequently, a lithium-ion conductor that exhibits excellent ion conductive property is realized. By using the lithium-ion conductor for a solid electrolyte, an all-solid lithium-ion secondary battery with high characteristics is realized.

18 Claims, 14 Drawing Sheets

US 9,595,736 B2

LITHIUM-ION CONDUCTOR AND ALL-SOLID LITHIUM-ION SECONDARY BATTERY

CROSS-REFERENCE TO RELATED APPLICATION

This application is a continuation application of International Application PCT/JP2012/075971 filed on Oct. 5, 2012, which designated the U.S., the entire contents of which are incorporated herein by reference.

FIELD

The embodiment discussed herein relates to a lithium-ion conductor and an all-solid lithium-ion secondary battery.

BACKGROUND

As lithium-ion secondary batteries, there are known those that, use a liquid electrolyte as an electrolyte provided between electrodes (a positive electrode and a negative electrode) and, in addition, those that use a solid electrolyte. The lithium-ion secondary battery that uses a solid electrolyte has such advantages that it is possible to suppress liquid leakage and firing that may occur in a lithium-ion secondary battery using a liquid electrolyte and it is excellent in cycle characteristics. The lithium-ion secondary battery that uses solid materials for electrodes and an electrolyte is referred to as, for example, an all-solid lithium-ion secondary battery.

As materials usable for the solid electrolyte, that is, as a lithium-ion conductor, there are known materials, such as $Li_2S$—$P_2S_5$-based, $Li_2S$—$P_2S_5$—$B_2S_3$-based and $Li_3PO_4$—$Li_2S$—$B_2S_3$-based materials, containing lithium (Li), phosphorus (P), boron (B), sulfur (S), oxygen (O) and the like. In addition, a germanium (Ge)-added material represented by a composition formula of $Li_{4-x}Ge_{1-x}P_xS_4$, a material represented by a composition formula of $Li_7PS_{6-x}Se_x$ ($0 \le x \le 6$), etc. are also known.

Japanese Laid-open Patent Publication No. 2003-22707
Japanese Laid-open Patent Publication No. 2003-68361
Japanese Laid-open Patent Publication No. 2009-193803
Chemistry—A European Journal, Vol. 16, pp. 5138 to 5147, 2010

Conventional lithium-ion conductors do not give sufficient ion conductive property and, when a conventional conductor is used as a solid electrolyte of an all-solid lithium-ion secondary battery, in some cases intended battery characteristics are not obtained.

Further, depending on the element contained in a lithium-ion conductor, the increase in cost and increase in weight of a solid electrolyte and an all-solid lithium-ion secondary battery containing the same may be brought about.

SUMMARY

According to one aspect, there is provided a lithium-ion conductor including a crystal structure whose composition formula is represented by $Li_{7+2x}P_{1-x}B_xS_6$ ($0<x \le 1$).

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
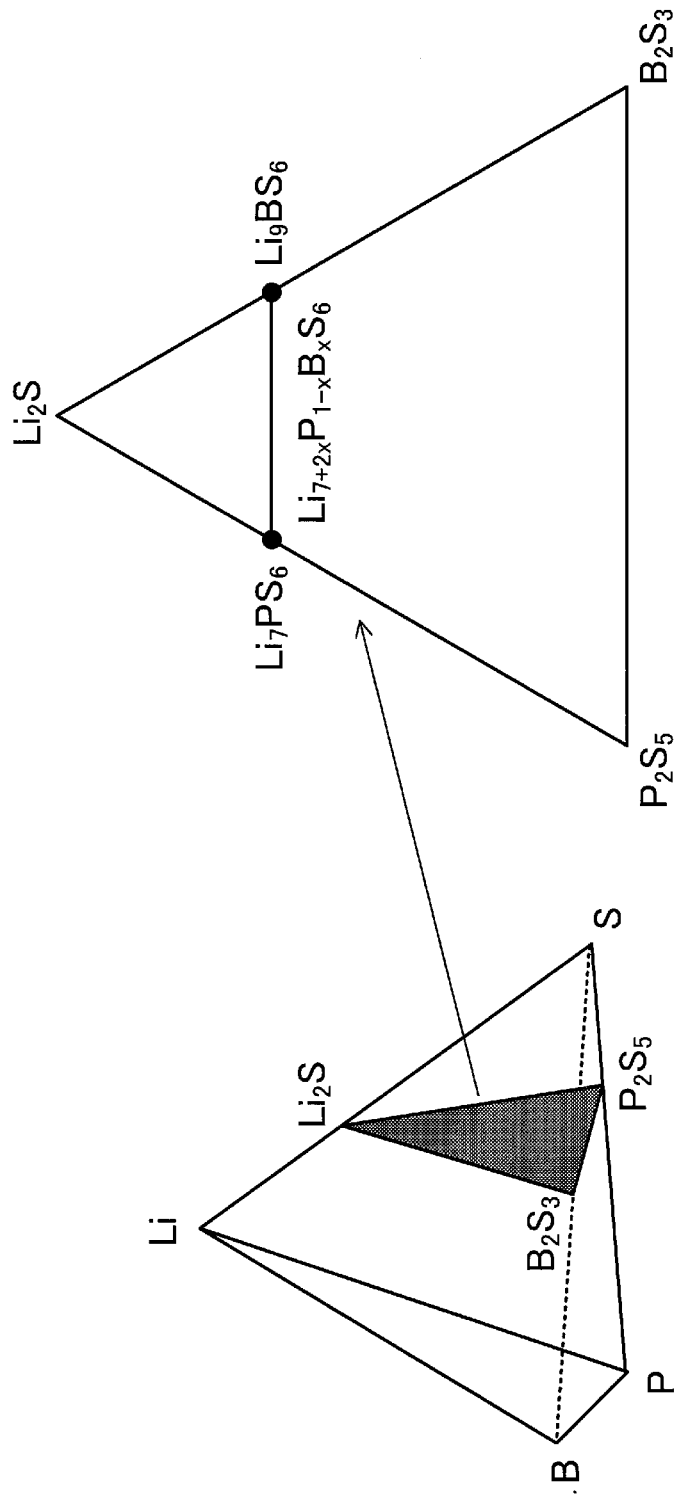
FIG. 1 is an explanatory view of a lithium-ion conductor.

FIG. 1 is an explanatory view of a lithium-ion conductor. The lithium-ion conductor has a crystal structure containing lithium (Li), phosphorus (P), boron (B) and sulfur (S) as constituent elements thereof. The lithium-ion conductor is, for example, a lithium sulfide ($Li_2S$)-phosphorus sulfide ($P_2S_5$)-boron sulfide ($B_2S_3$)-based material as illustrated in FIG. 1, and has a crystal structure represented by a composition formula of $Li_{7+2x}P_{1-x}B_xS_6$ ($0<x \le 1$) in a $Li_7PS_6$—$Li_9BS_6$ solid solution system. By changing B quantity x, the lithium-ion conductor may take various compositions of from $Li_7PS_6$ to $Li_9BS_6$.

Figure 2:
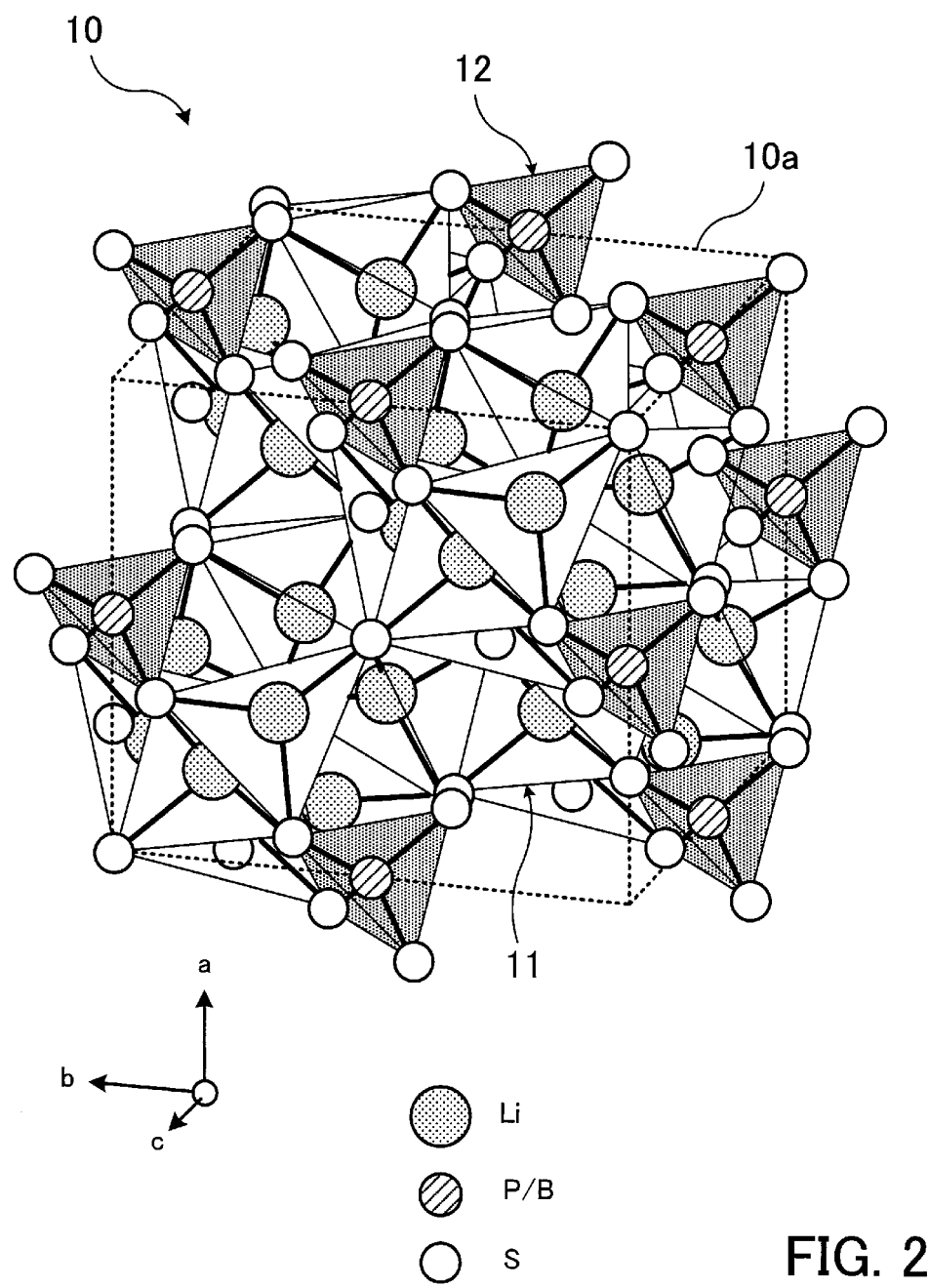
FIG. 2 is a (first) schematic view of the crystal structure of a lithium-ion conductor.
Figure 3:
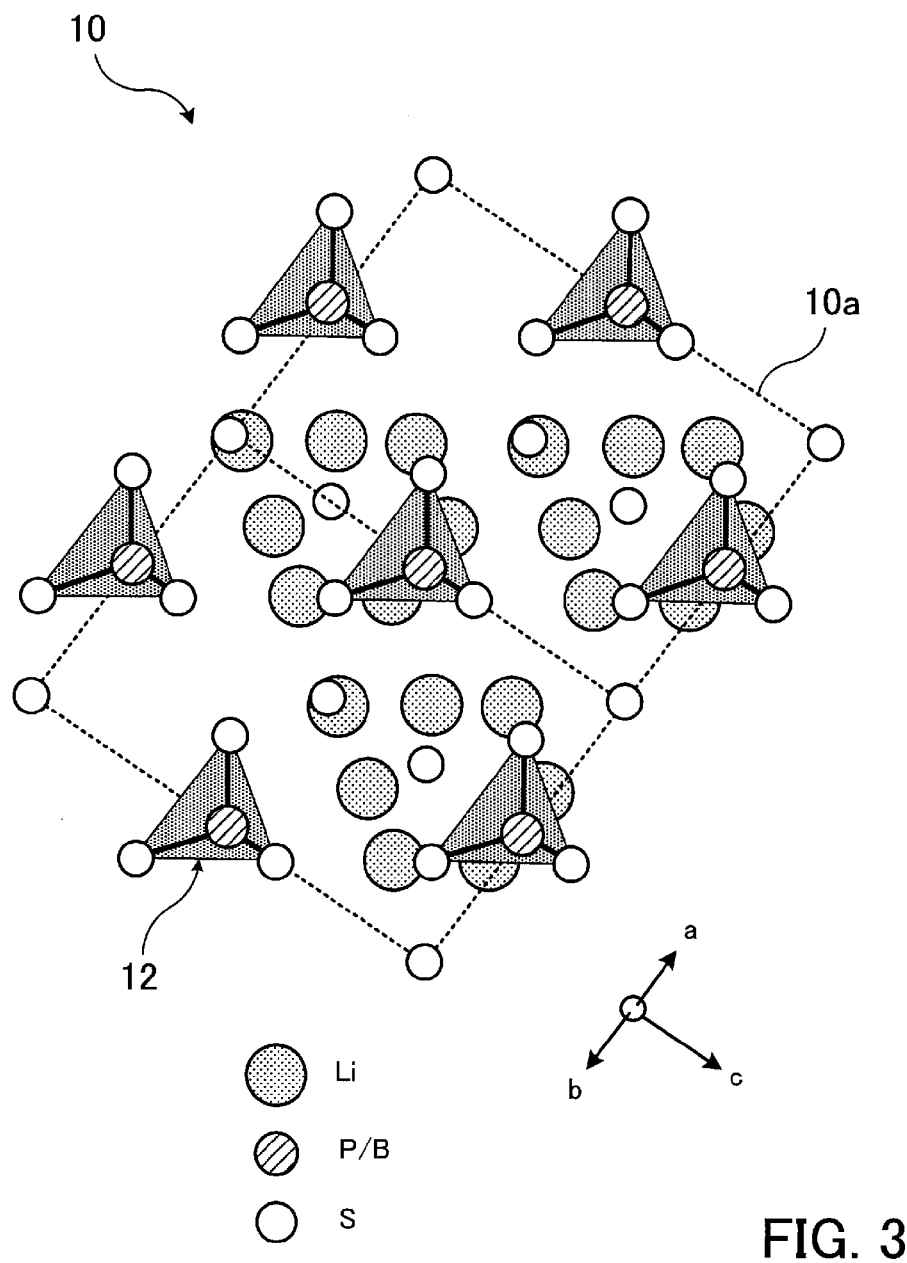
FIG. 3 is a (second) schematic view of the crystal structure of a lithium-ion conductor.
Figure 4:
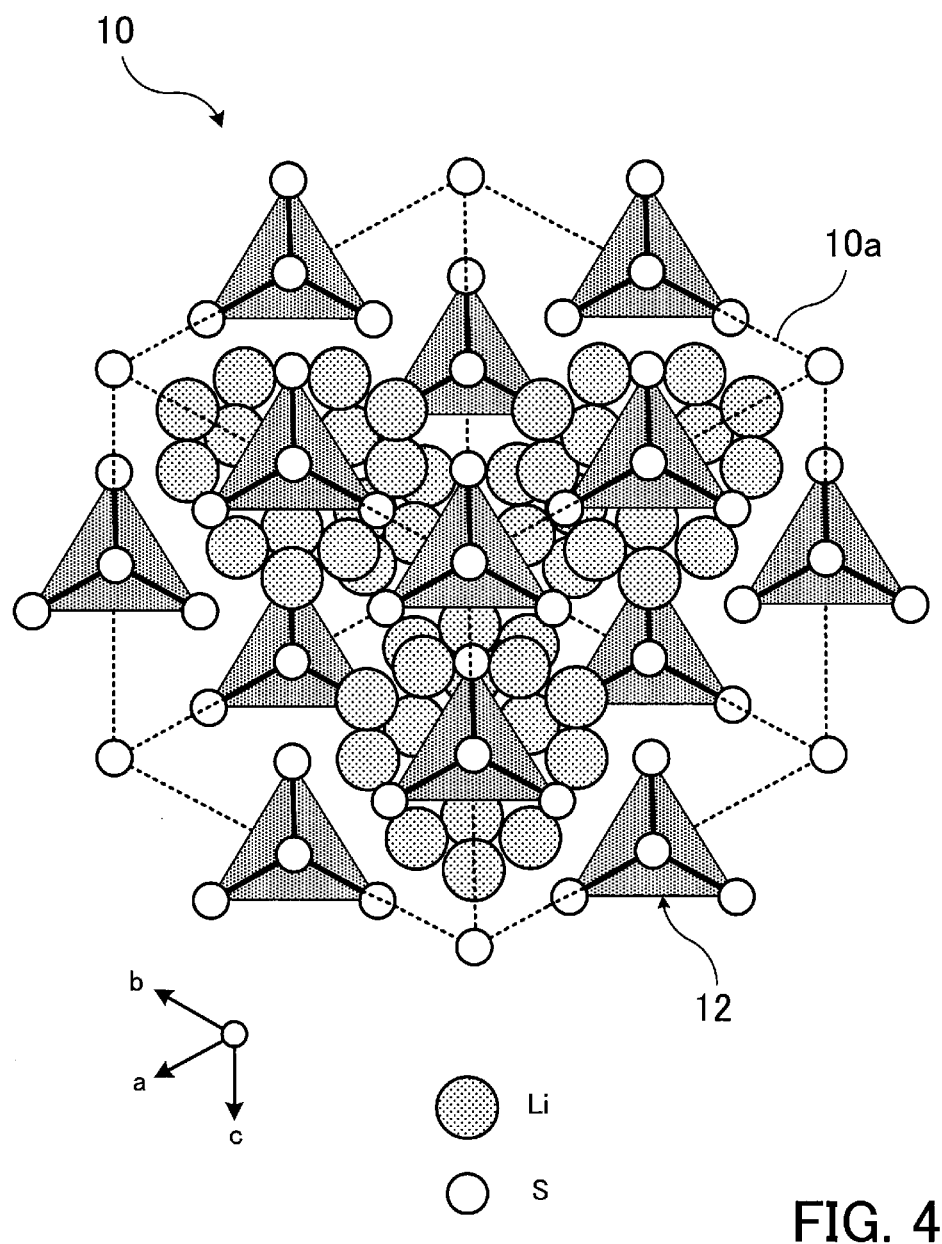
FIG. 4 is a (third) schematic view of the crystal structure of a lithium-ion conductor.
Figure 5:
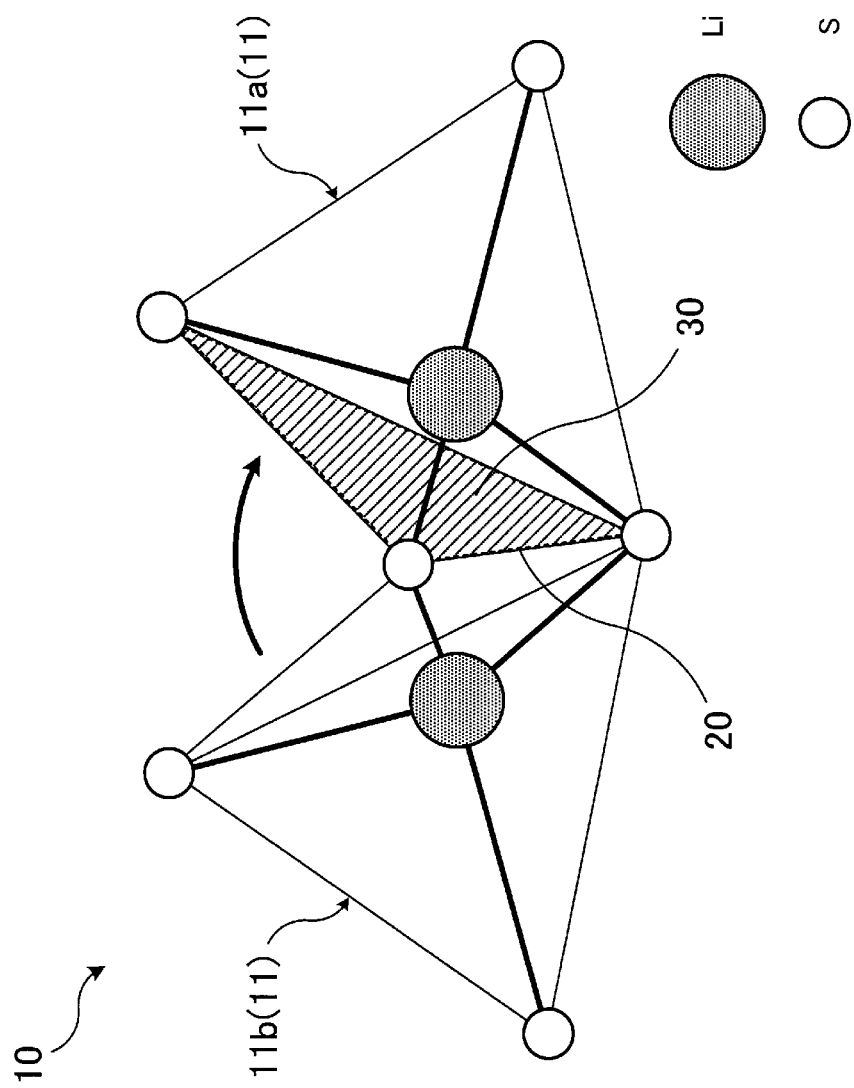
FIG. 5 is an explanatory view of the crystal structure and ion conductive property of a lithium-ion conductor.

FIGS. 2 to 4 are schematic views of the crystal structure of the lithium-ion conductor. Here, FIG. 2 is a schematic view of a unit lattice in the crystal structure of the lithium-ion conductor, FIG. 3 is a schematic view of the crystal structure seen from the [110] direction of the lithium-ion conductor, and FIG. 4 is a schematic view of the crystal structure seen from the [111] direction of the lithium-ion conductor. FIG. 5 is an explanatory view of the crystal structure and ion conductive property of the lithium-ion conductor.

A lithium-ion conductor 10 has a crystal structure whose composition formula is $Li_{7+2x}P_{1-x}B_xS_6$ ($0<x \le 1$) and whose space group belongs to F-43m (No. 216). Meanwhile, "−" of the space group F-43m means an overline of "4."

The lithium-ion conductor 10 contains, as illustrated in FIG. 2, a $LiS_4$ tetrahedron 11 in which Li is located at the center of the tetrahedron and S is located at (coordinated to) four vertexes of the tetrahedron. Furthermore, the lithium-ion conductor 10 contains, as illustrated in FIGS. 2 to 4, a $PS_4$ tetrahedron or a $BS_4$ tetrahedron (P/$BS_4$ tetrahedron) 12 in which P or B (P/B) is located at the center of the tetrahedron and S is located at (covalently bonded to) four vertexes of the tetrahedron. The lithium-ion conductor 10 contains these $LiS_4$ tetrahedron 11 and $P/BS_4$ tetrahedron 12, in plural number respectively.

Meanwhile, by the movement of the ion of Li (lithium ion $Li^+$) that is the center element constituting the $LiS_4$ tetrahedron 11 in the crystal structure of the lithium-ion conductor 10, ion conductive property is exhibited in the crystal structure.

The $P/BS_4$ tetrahedron 12 forms a skeleton structure in the crystal structure of the lithium-ion conductor 10. A plurality of $LiS_4$ tetrahedrons 11 is arranged at prescribed positions in the crystal structure in which the skeleton structure is formed by the $P/BS_4$ tetrahedron 12 in this way.

As illustrated in FIG. 5, in the lithium-ion conductor 10, the $LiS_4$ tetrahedrons 11 (11a and 11b) have such a structure as having two Ss coordinated to respective Lis in common. That is, in the lithium-ion conductor 10, the $LiS_4$ tetrahedrons 11 are arranged such that there exists a ridge 20 in which respective planes (triangle planes) 30 containing these two Ss held in common intersect. In other words, the $LiS_4$ tetrahedrons 11 are arranged so as to have respective ridges 20 in common.

Furthermore, in the lithium-ion conductor 10, the $LiS_4$ tetrahedron 11 and the $P/BS_4$ tetrahedron 12 at prescribed positions have such a structure as having two Ss coordinated to the Li of the $LiS_4$ tetrahedron 11 and two Ss covalently bonded to the P/B of the $P/BS_4$ tetrahedron 12 in common. That is, the $LiS_4$ tetrahedrons 11 and the $P/BS_4$ tetrahedron 12 at prescribed positions are arranged such that there exists a ridge in which respective planes (triangle planes) containing two Ss held in common between them intersect. In other words, the $LiS_4$ tetrahedrons 11 and the $P/BS_4$ tetrahedron 12 are arranged so as to have respective ridges in common.

The $P/BS_4$ tetrahedrons 12 are, as illustrated in FIGS. 2 to 4, arranged such that, in the crystal structure (in a unit lattice 10a) of the lithium-ion conductor 10, directions of the vertexes (the positions of S) of the $P/BS_4$ tetrahedrons 12 point to the same direction.

In this way, the lithium-ion conductor 10 has the crystal structure of the space group F-43m in which the skeleton structure is formed of the group of $P/BS_4$ tetrahedrons 12 having vertexes pointing to the same direction and the group of $LiS_4$ tetrahedrons 11 is contained at an internal prescribed position.

In the lithium-ion conductor 10 having the crystal structure as described above, an ionic conductive path, through which lithium ions ($Li^+$) pass, is formed in the group of $LiS_4$ tetrahedrons 11 arranged via the ridge 20.

Here, the ionic conductive path will be explained with reference to FIG. 5. FIG. 5 illustrates two $LiS_4$ tetrahedrons 11 arranged via the ridge 20.

In the lithium-ion conductor 10, a triangle plane 30 of a certain $LiS_4$ tetrahedron 11a (11), the triangle plane 30 including the ridge 20 held in common with another $LiS_4$ tetrahedron 11b (11), becomes an ionic conductive path (illustrated with a thick arrow in FIG. 5) through which lithium ions ($Li^+$) pass. Here, this kind of triangle plane 30 of the $LiS_4$ tetrahedron 11, which becomes the ionic conductive path, shall be referred to as a triangle window 30.

In the lithium-ion conductor 10 represented by the composition formula of $Li_{7+2x}P_{1-x}B_xS_6$ (0<x≤1), since the composition thereof contains B, the size (area) of the triangle window 30 changes.

Figure 6:
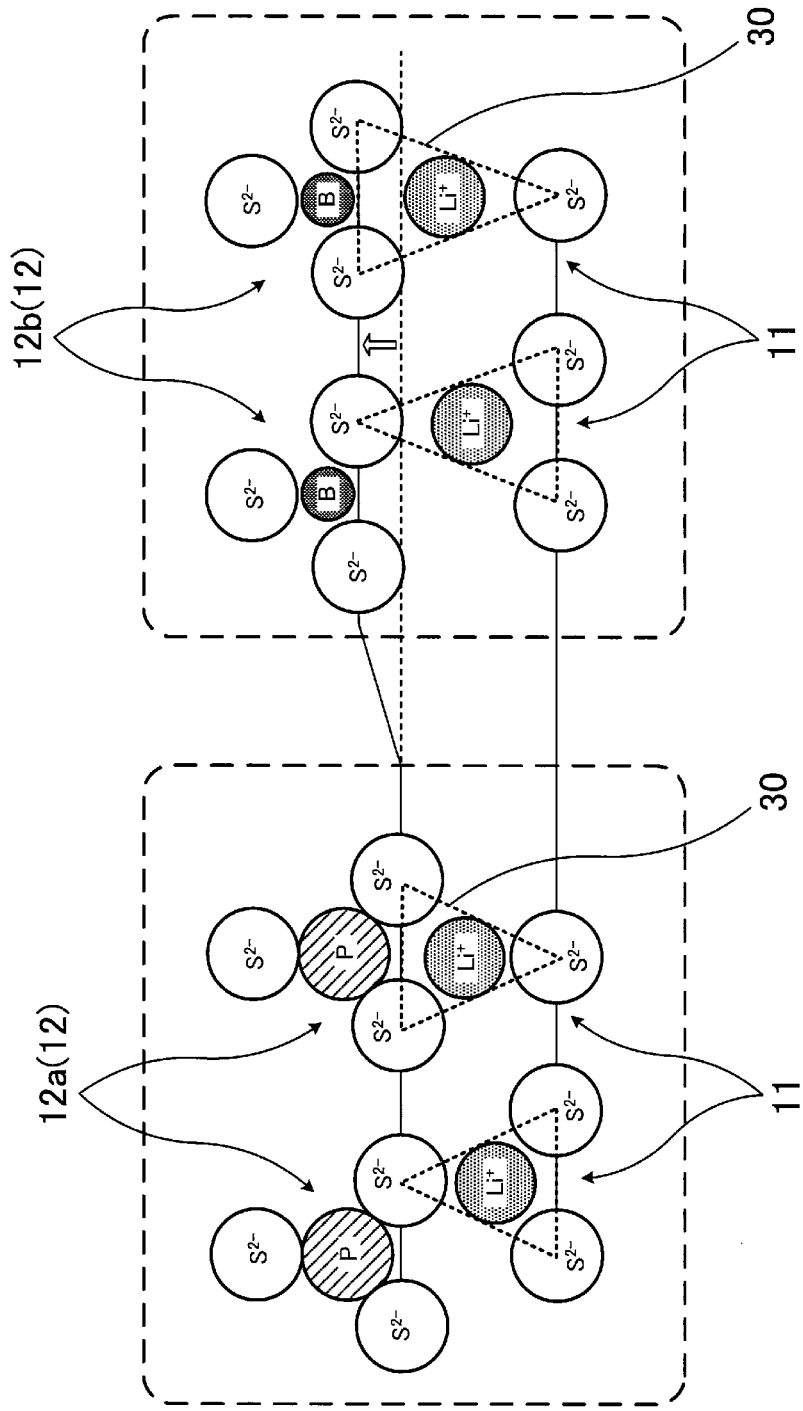
FIG. 6 is an explanatory view of change in size of a triangle window.

FIG. 6 is an explanatory view of change in size of a triangle window.

As described above, in the lithium-ion conductor 10, the $LiS_4$ tetrahedron 11 and the $P/BS_4$ tetrahedron 12 at prescribed positions take a structure of having respective two Ss in common. FIG. 6 illustrates the $LiS_4$ tetrahedron 11 and the $P/BS_4$ tetrahedron 12 (tetrahedron sulfide) having Ss in common in this way.

Now, as illustrated in the left drawing in FIG. 6, in the structural portion in which the $LiS_4$ tetrahedron 11 and the $PS_4$ tetrahedron 12a (12) have S in common, P being the center element of the $PS_4$ tetrahedron 12a is substituted by B. By substituting P of the $PS_4$ tetrahedron 12a by B in this way, as illustrated in the right drawing in FIG. 6, a structural portion in which the $LiS_4$ tetrahedron 11 and the $BS_4$ tetrahedron 12b (12) have S in common is obtained.

Here, the ionic radius of P is 0.30 Å, and the ionic radius of B is 0.25 Å. When P is substituted by B, the position of S, which is in the state of hexagonal closest packing by means of covalent bonds of P—S and B—S in the crystal structure of the lithium-ion conductor 10, changes. As the result, as illustrated with a thick arrow in the right drawing in FIG. 6, the position of S changes from the state illustrated in the left drawing in FIG. 6 and the size of the triangle window 30 of the $LiS_4$ tetrahedron 11 becomes greater. That is, the size of the ionic conductive path through which lithium ions pass expands.

Meanwhile, two tetrahedron sulfides are exemplified in FIG. 6, but, in the lithium-ion conductor 10, among tetrahedron sulfides having S in common with the $LiS_4$ tetrahedron 11, a part may have become the $BS_4$ tetrahedron 12b (the remains are the $PS_4$ tetrahedron 12a), or all may have become the $BS_4$ tetrahedron 12b. That is, the lithium-ion conductor 10 of a composition formula of $Li_{7+2x}P_{1-x}B_xS_6$ (0<x<1) containing P has a crystal structure in which the $PS_4$ tetrahedron 12a and the $BS_4$ tetrahedron 12b coexist and form the skeleton structure. The lithium-ion conductor 10 of a composition formula of $Li_9BS_6$ not containing P has a crystal structure in which the $BS_4$ tetrahedron 12b forms the skeleton structure.

Meanwhile, a crystal structure represented by a composition formula of $Li_7PS_6$ not containing B has such a structure that the $LiS_4$ tetrahedron 11 and the $PS_4$ tetrahedron 12a have S in common as illustrated in the left drawing in FIG. 6. In contrast, in the above-described lithium-ion conductor 10 of a crystal structure represented by the composition formula of $Li_{7+2x}P_{1-x}B_xS_6$ (0<x≤1) containing B, since B is contained, as described above, the size of the triangle window 30 becomes greater and the lithium-ion conductor 10 comes to have an ionic conductive path greater than that of $Li_7PS_6$.

It is possible to say that the lithium-ion conductor 10 of $Li_{7+2x}P_{1-x}B_xS_6$ (0<x≤1) has such a structure that a prat or all of Ps in $Li_7PS_6$ are substituted by Bs, but, only by substituting pentavalent P by trivalent B, charge balance breaks down and a lithium ion is added to compensate this. That is, regarding the charge balance of P, B and Li, such a relationship as formula (1) below holds and every substitution of one P by one B makes it possible to add two monovalent lithium ions.

$$P^{5+} \rightarrow B^{3+} + 2Li^+ \quad (1)$$

Figure 7:
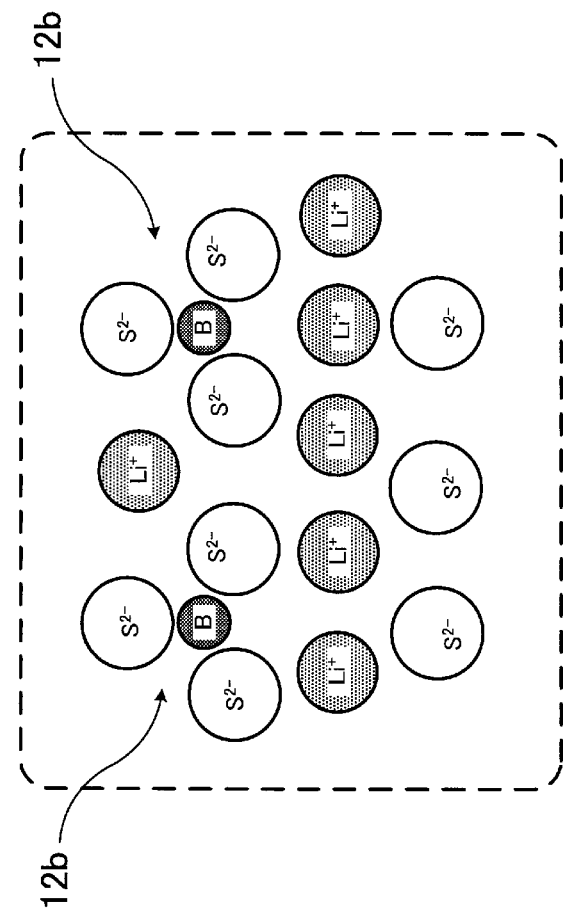
FIG. 7 is an explanatory view of addition of lithium ions.

FIG. 7 is an explanatory view of the addition of lithium ions.

For example, as illustrated in FIG. 6, in the case where two Ps are substituted by two Bs, in order to take the balance of charges, furthermore four Lis (lithium ions $Li^+$) are added. The lithium ion functions as a conductive carrier of the lithium-ion conductor 10. Therefore, the addition of the lithium ion contributes to the increase in the conductive carrier of the lithium-ion conductor 10.

Figure 8:
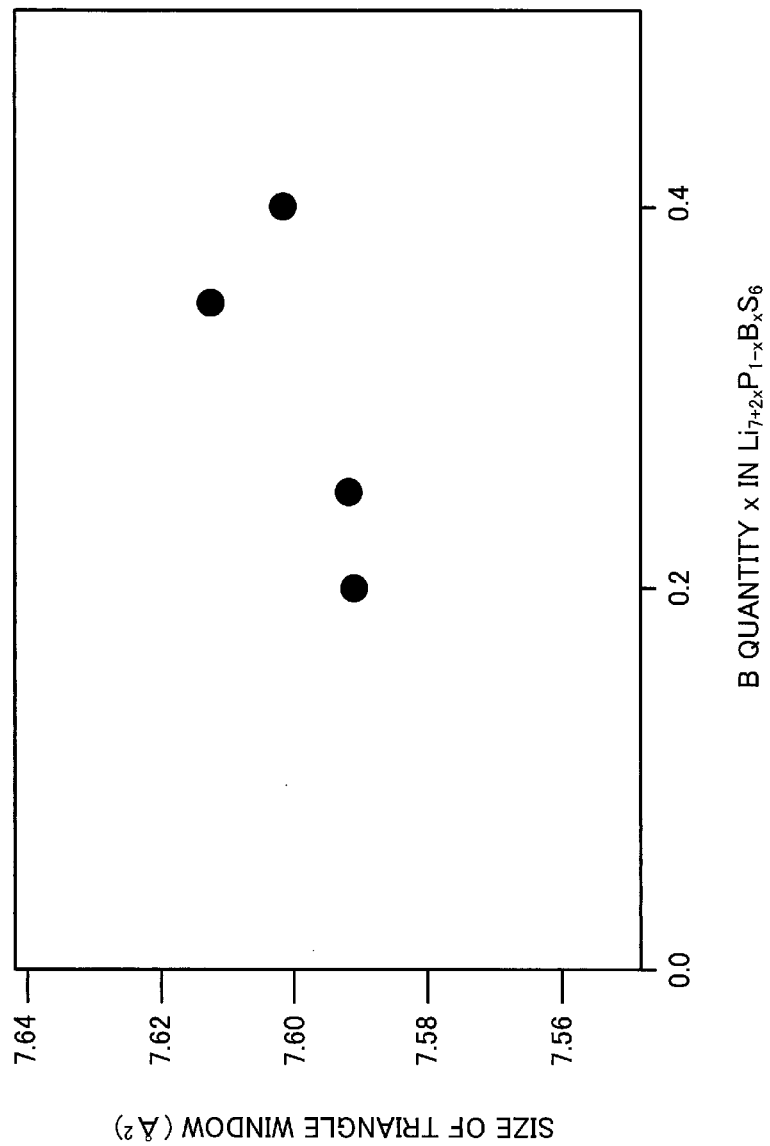
FIG. 8 illustrates an example of the relationship of a B quantity x of $Li_{7+2x}P_{1-x}B_xS_6$ and the size of a triangle window.
Figure 9:
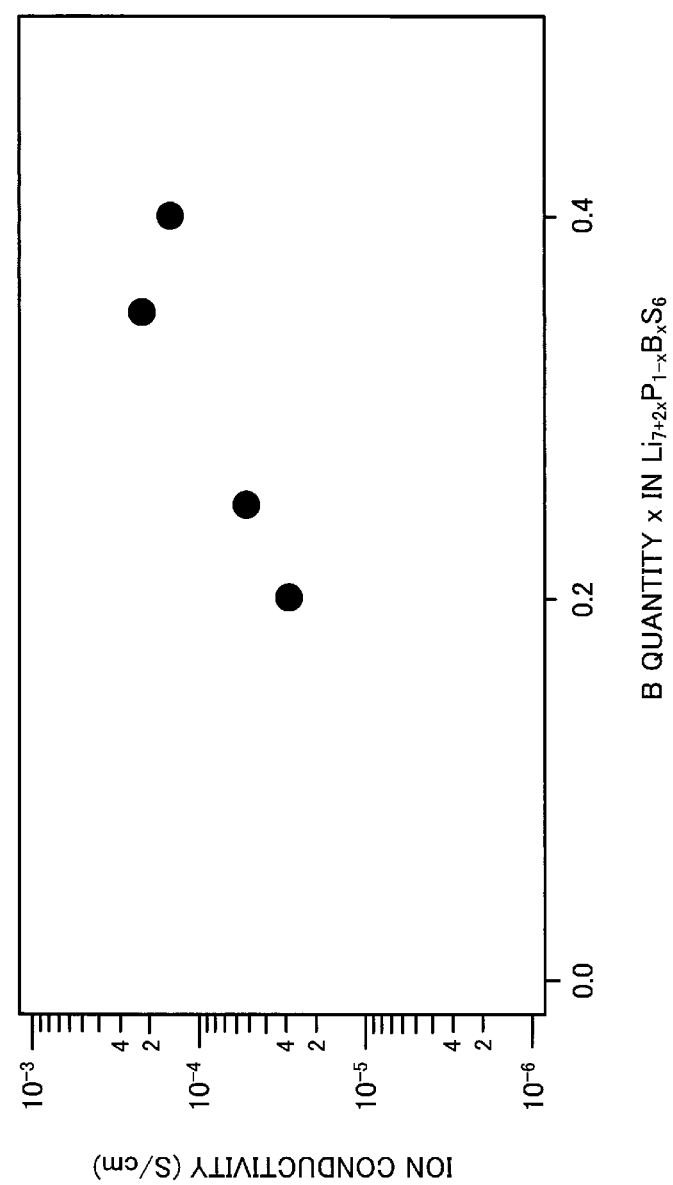
FIG. 9 illustrates an example of the relationship of a B quantity x of $Li_{7+2x}P_{1-x}B_xS_6$ and an ion conductivity.

FIG. 8 illustrates an example of the relationship of the B quantity x of $Li_{7+2x}P_{1-x}B_xS_6$ and the triangle window size, and FIG. 9 illustrates an example of the relationship of the B quantity x of $Li_{7+2x}P_{1-x}B_xS_6$ and an ion conductivity.

In the case of the lithium-ion conductor 10 of the composition formula of $Li_{7+2x}P_{1-x}B_xS_6$ containing B, as illustrated in FIG. 8, the size ($Å^2$) of the triangle window tends to increase along with the increase in the B quantity x. Further, in the case of the lithium-ion conductor 10 of the composition formula of $Li_{7+2x}P_{1-x}B_xS_6$ containing B, as illustrated in FIG. 9, the ion conductivity (S/cm) tends to increase along with the increase in the B quantity x. It is possible to say that the increase in the size of the triangle window 30 caused by the incorporation of B contributes to the increase in the ion conductivity of the lithium-ion conductor 10.

Furthermore, in the lithium-ion conductor 10, the size of the triangle window 30 is made greater by incorporating B and lithium ions being a conductive carrier are added corresponding to the B quantity x. In the case of the lithium-ion conductor 10, due to the increase in the size and the increase in the conductive carrier of the triangle window 30, it becomes possible to realize high ion conductivity as compared with conductors not containing B. Meanwhile, the ion conductivity of $Li_7PS_6$ not containing B is reported to be an order of $10^{-5}$ S/cm to $10^{-7}$ S/cm.

Meanwhile, as a lithium-ion conductor, there is known one having a crystal structure represented by a composition formula of $Li_3PS_4$. In $Li_3PS_4$, there exist at least two kinds of crystal structure of a γ type (also referred to as a γ phase) and a β type (also referred to as a β phase). The γ type $Li_3PS_4$ has a crystal structure whose space group belongs to $Pmn2_1$ (No. 31), and the β type $Li_3PS_4$ has a crystal structure whose space group belongs to Pnma (No. 62).

Figure 10:
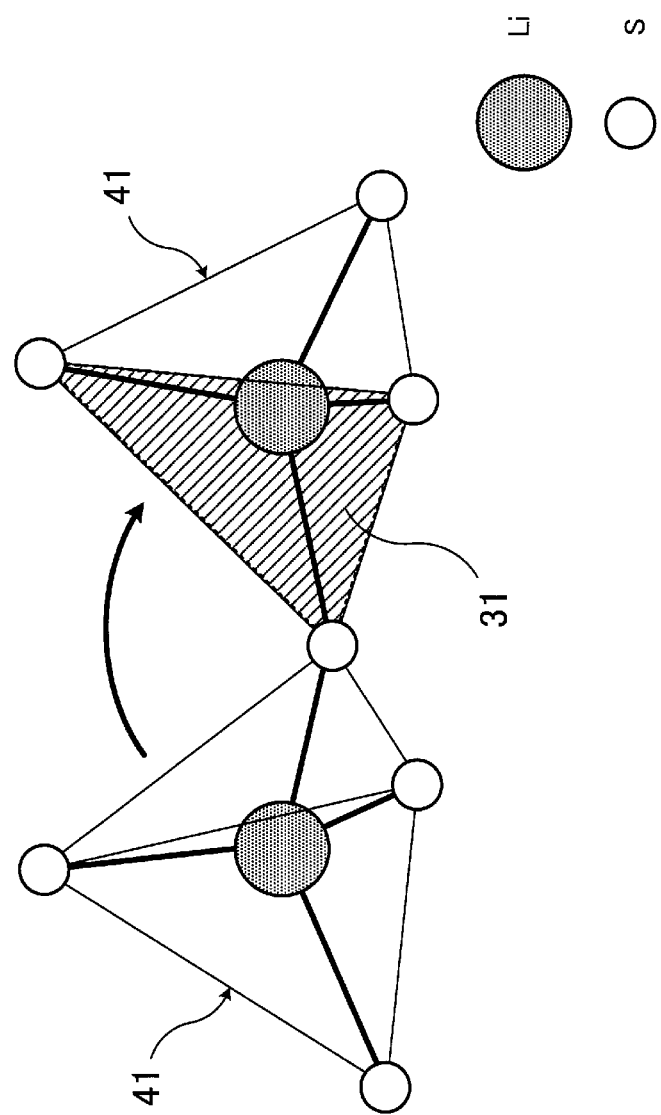
FIG. 10 is an explanatory view of the ionic conductive path of γ type $Li_3PS_4$.
Figure 11:
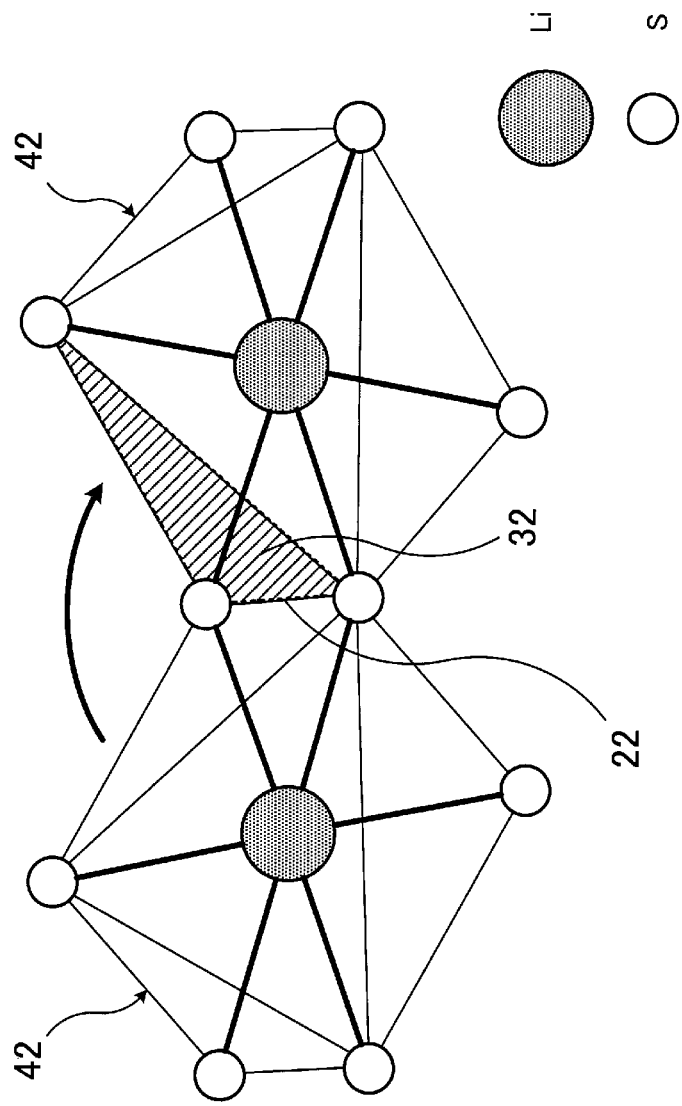
FIG. 11 is an explanatory view of the ionic conductive path of β type $Li_3PS_4$.

FIG. 10 is an explanatory view of an ionic conductive path of the γ type $Li_3PS_4$, and FIG. 11 is an explanatory view of an ionic conductive path of the β type $Li_3PS_4$. Each of FIGS. 10 and 11 illustrates, for convenience, two polyhedrons having Li as a center element, the polyhedron being contained in the crystal structure.

The γ type $Li_3PS_4$ whose space group belongs to $Pmn2_1$ contains a $LiS_4$ tetrahedron 41, as illustrated in FIG. 10, in which Li is located at the center of the tetrahedron and S is located at (coordinated to) four vertexes of the tetrahedron. The γ type $Li_3PS_4$ has a structural portion in which the $LiS_4$ tetrahedrons 41 as described above are arranged so as to have one S at the vertex in common. The triangle window 31 of the $LiS_4$ tetrahedron 41 in this kind of γ type $Li_3PS_4$ becomes an ionic conductive path (illustrated with a thick arrow in FIG. 10) through which lithium ions pass, and the size (area) of the triangle window 31 is 6.853 $Å^2$.

The β type $Li_3PS_4$ whose space group belongs to Pnma contains a $LiS_6$ octahedron 42, as illustrated in FIG. 11, in which Li is located at the center of the octahedron and S is located at (coordinated to) six vertexes of the octahedron. The β type $Li_3PS_4$ has a structural portion in which the $LiS_6$ octahedrons 42 as described above are arranged so as to have two Ss at the vertexes in common, that is, so that the $LiS_6$ octahedrons 42 have a ridge 22 in common. A triangle window 32 of the $LiS_6$ octahedron 42 in this kind of β type $Li_3PS_4$ becomes an ionic conductive path (illustrated with a thick arrow in FIG. 11) through which lithium ions pass, and the size (area) of the triangle window 32 is 7.060 $Å^2$.

It is said that the γ type $Li_3PS_4$ has an ion conductivity lower than that of the β type $Li_3PS_4$, and such tendency of the ion conductivity correlates also to the above-described relationship of sizes of the triangle window 31 and the triangle window 32.

On the other hand, $Li_{7+2x}P_{1-x}B_xS_6$ of the lithium-ion conductor 10 has, as illustrated in FIG. 5, a structural portion in which the $LiS_4$ tetrahedrons 11 are arranged so as to have two Ss at vertexes in common and have the ridge 20 in common between the two Ss. In $Li_{7+2x}P_{1-x}B_xS_6$, for example, when the B quantity x=0.2, the size (area) of the triangle window 30 becomes 7.590 $Å^2$, and may be made greater than those of both the triangle window 31 of γ type $Li_3PS_4$ and the triangle window 32 of β type $Li_3PS_4$.

Figure 12:
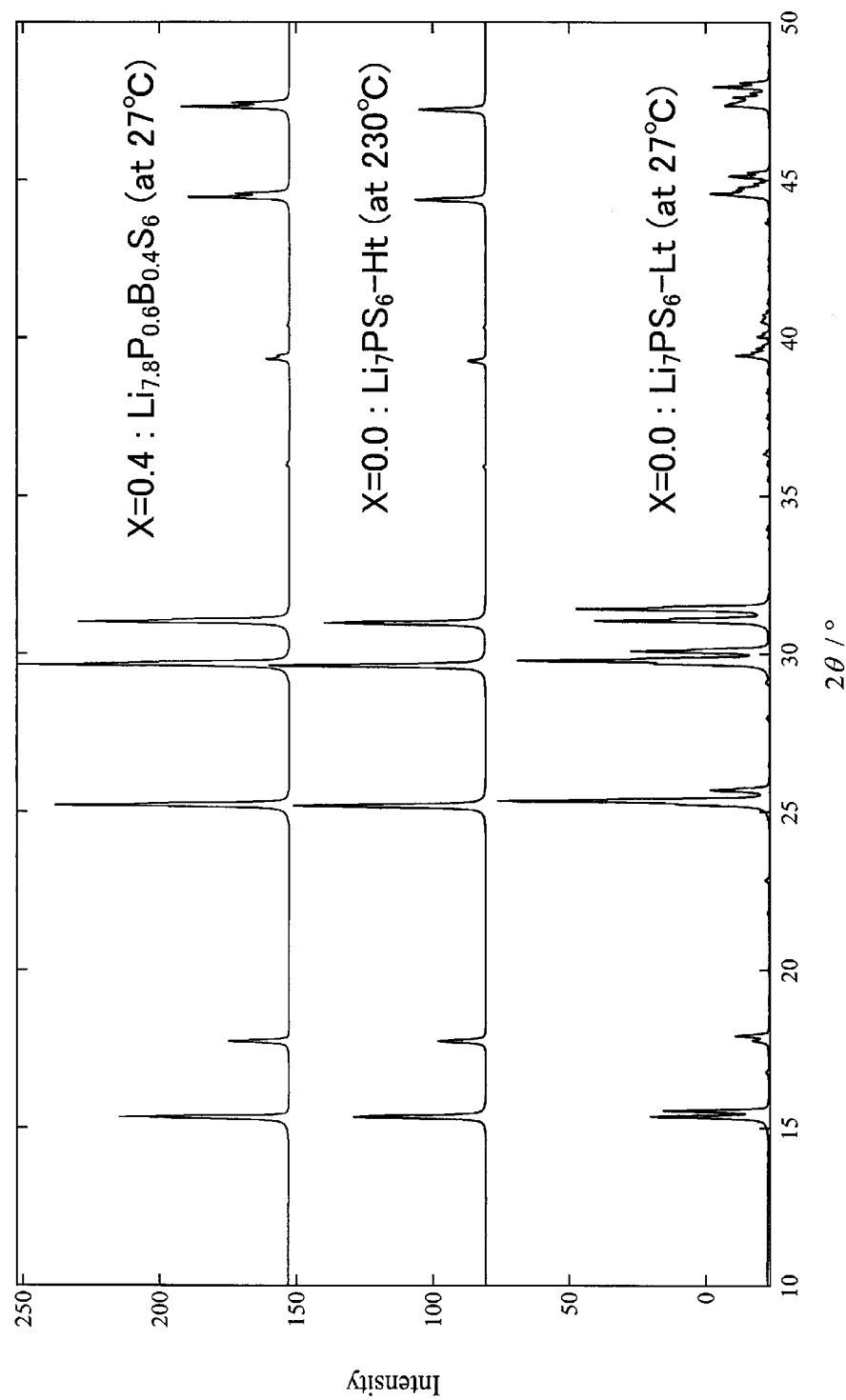
FIG. 12 illustrates an example of results of X-ray diffraction measurements.

FIG. 12 illustrates an example of results of X-ray diffraction measurement.

In FIG. 12, X-ray diffraction data of the case where B quantity x of $Li_{7+2x}P_{1-x}B_xS_6$=0.4, that is, $Li_{7.8}P_{0.6}B_{0.4}S_6$ (x=0.4: $Li_{7.8}P_{0.6}B_{0.4}S_6$) at a temperature of 27° C. is illustrated. Further, in FIG. 12, for comparison, as to the case where B quantity x of $Li_{7+2x}P_{1-x}B_xS_6$=0.0, that is $Li_7PS_6$, X-ray diffraction data at a temperature of 230° C. (x=0.0: $Li_7PS_6$-Ht) and X-ray diffraction data at a temperature of 27° C. (x=0.0: $Li_7PS_6$-Lt) are illustrated.

As illustrated in FIG. 12, first, $Li_7PS_6$-Ht and $Li_7PS_6$-Lt have X-ray diffraction peaks at 2θs (degrees) equal to each other, and it is known that the high temperature phase at 230° C. and the low temperature phase at 27° C. have an equal crystal structure. Further, $Li_{7.8}P_{0.6}B_{0.4}S_6$ containing B has, as illustrated in FIG. 12, X-ray diffraction peaks at 2θs (degrees) equal to those of $Li_7PS_6$-Ht and $Li_7PS_6$-Lt. It is possible to say that $Li_{7.8}P_{0.6}B_{0.4}S_6$ has the crystal structure equal to those of both $Li_7PS_6$-Ht and $Li_7PS_6$-Lt.

$Li_{7+2x}P_{1-x}B_xS_6$ has a crystal structure of a $Li_7PS_6$—$Li_9BS_6$ solid solution system which can contain B in the crystal structure equal to the crystal structure of $Li_7PS_6$.

Subsequently, a formation method of the lithium-ion conductor 10 will be explained.

The lithium-ion conductor 10 of $Li_{7+2x}P_{1-x}B_xS_6$ (0<x<1) is obtained by mixing materials containing Li, P, B and S being constituent elements of the lithium-ion conductor 10, heating and melting the mixture, and then cooling the same to thereby form a calcined body. For example, $Li_2S$, $P_2S_5$, B and S are mixed at a weight ratio based on the composition ratio of prescribed B quantity x (0<x<1) in the $Li_7PS_6$—$Li_9BS_6$ solid solution system, the mixture is heated and molten and then cooled to thereby form a calcined body.

Further, the lithium-ion conductor 10 of $Li_9BS_6$ is obtained by mixing materials containing Li, B and S being constituent elements of the lithium-ion conductor 10, heating and melting the mixture, and then cooling the same to thereby form a calcined body. For example, $Li_2S$, B and S are mixed at a weight ratio based on the composition ratio of $Li_9BS_6$, the mixture is heated and molten and then cooled to thereby form a calcined body.

The obtained calcined body may be calcined again at temperatures at which the calcined body is not molten, or may be pulverized and calcined again at temperatures at which the calcined body is not molten, for achieving stabilization of the crystal structure.

As a more specific example of the formation method of the lithium-ion conductor 10, there is a method below. First, prescribed weights of $Li_2S$, $P_2S_5$, B and S, or prescribed weights of $Li_2S$, B and S are mixed using an agate mortar in a glove box charged with an inert gas and pellets are formed. Subsequently, the mixture formed into a pellet is enclosed under a reduced pressure in a quartz tube, the inner surface thereof being covered with vitreous carbon, which is heated to about 700° C. that is the temperature at which the mixture is molten and held for about four hours, and then cooled to room temperature to thereby obtain a calcined body. Subsequently, the obtained calcined body is pulverized for about 90 minutes using an oscillating cup mill, again, is subjected to uniaxial press and molded, and, after that, the molded calcined body is enclosed under a reduced pressure, which is calcined at about 550° C. being a temperature at which the calcined body is not molten for about eight hours. Using such a method, the lithium-ion conductor 10 of $Li_{7+2x}P_{1-x}B_xS_6$ (0<x≤1) containing a prescribed quantity of B is obtained.

Hereinbefore, the crystal structure and the formation method of the lithium-ion conductor 10 of $Li_{7+2x}P_{1-x}B_xS_6$ (0<x≤1) is described.

Meanwhile, in a material used as a lithium-ion conductor, in addition to the crystal structure of the composition formula of $Li_{7+2x}P_{1-x}B_xS_6$ (0<x≤1), other crystal structures such as γ type $Li_3PS_4$ or β type $Li_3PS_4$, or one obtained by substituting a part of Ps in β type $Li_3PS_4$ by Bs may be contained. Even in such a lithium-ion conductor containing a plurality of kinds of crystal structure, in the crystal structure of $Li_{7+2x}P_{1-x}B_xS_6$ (0<x≤1) contained therein, the increase in the triangle window 30 and the increase in the lithium ion as described above are possible. Consequently, it becomes possible to realize a lithium-ion conductor exhibiting excellent ion conductive property.

The lithium-ion conductor containing $Li_{7+2x}P_{1-x}B_xS_6$ (0<x≤1) and another crystal structure as described above may also be formed using the above-described method. That is, it is formed by mixing Li, P, B and S, heating and melting the mixture, and then cooling the same to thereby form a calcined body, or by performing pulverization and re-calcination after that.

As an example, when forming a lithium-ion conductor containing $Li_{7.8}P_{0.5}B_{0.4}S_6$ (B quantity x=0.4) in 2 g, each of 1.3301 g of $Li_2S$, 0.4949 g of $P_2S_5$, 0.0320 g of B and 0.1428 g of S is weighed and mixed. Then, by performing heating and melting and cooling etc., the lithium-ion conductor is obtained. For example, by adjusting various formation conditions such as heating temperature and time, a lithium-ion conductor including the crystal structure of $Li_{7.8}P_{0.6}B_{0.4}S_6$, and the crystal structure of β type $Li_3PS_4$ or a crystal structure in which a part of Ps thereof are substituted by Bs is obtained.

Figure 13:
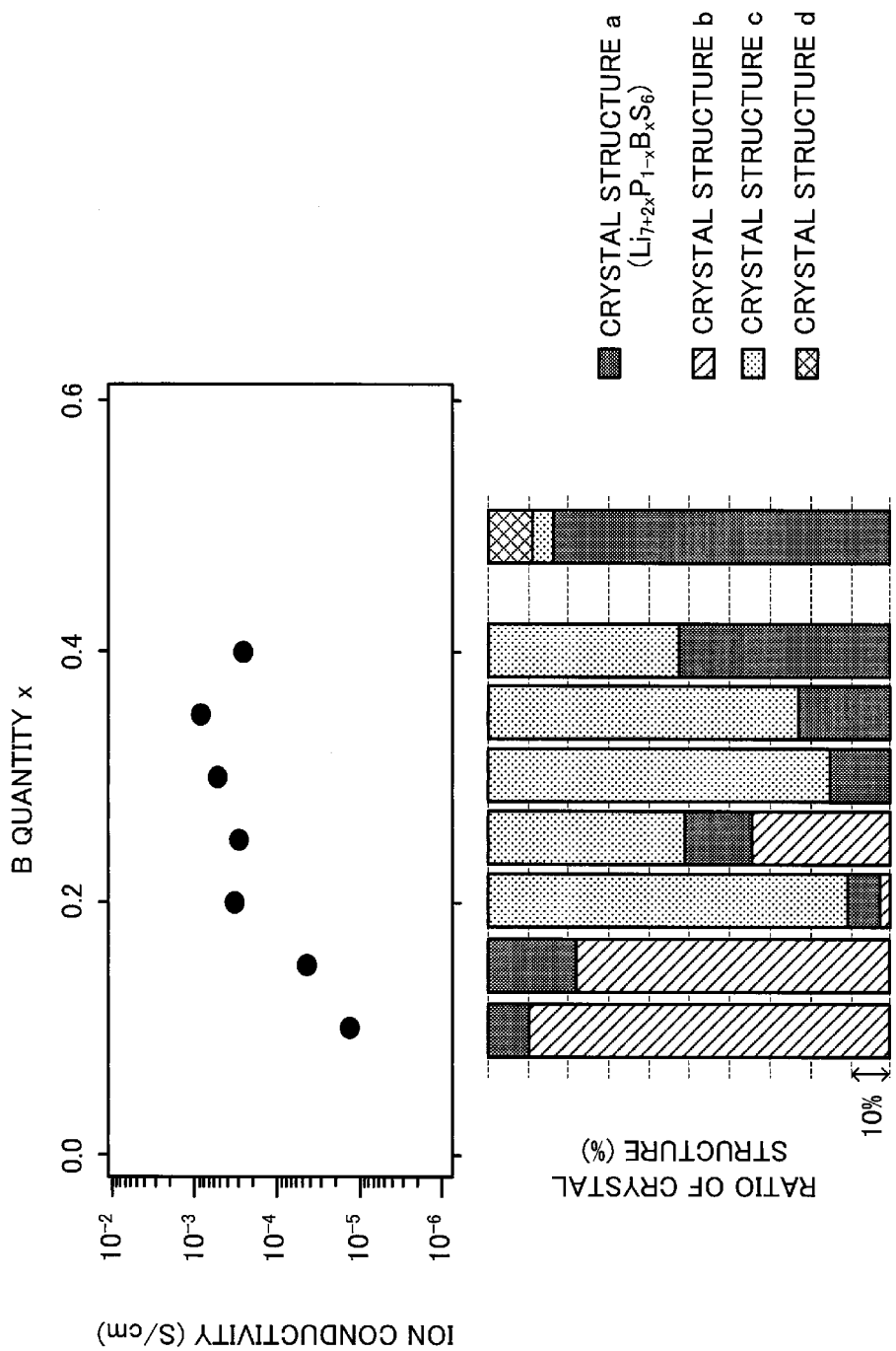
FIG. 13 illustrates an example of relationships of a B quantity of a lithium-ion conductor including a plurality of kinds of crystal structure and an ion conductivity.

FIG. 13 illustrates an example of the relationship between the B quantity of a lithium-ion conductor containing a plurality of kinds of crystal structure and an ion conductivity.

The upper drawing in FIG. 13 illustrates the relationship between the B quantity x of the $Li_{7+2x}P_{1-x}B_xS_6$ (0<x≤1) contained in the lithium-ion conductor and the ion conductivity (S/cm). The lower drawing in FIG. 13 illustrates the B quantity x (corresponding to the value illustrated in the upper drawing in FIG. 13) and the ratio (%) of the crystal structure contained in the lithium-ion conductor at that time. In the lower drawing in FIG. 13, a crystal structure a is the crystal structure of $Li_{7+2x}P_{1-x}B_xS_6$, and crystal structures b, c, d are crystal structures other than $Li_{7+2x}P_{1-x}B_xS_6$. Examples of the crystal structures b, c, d include aforementioned γ type $Li_3PS_4$ (space group Pmn2$_1$), β type $Li_3PS_4$ or one in which a part of Ps of β type $Li_3PS_4$ are substituted by Bs (space group Pnma), $Li_2S$ etc.

As illustrated in the lower drawing in FIG. 13, a lithium-ion conductor including, in addition to the crystal structure a of $Li_{7+2x}P_{1-x}B_xS_6$ of each B quantity x, other crystal structures b, c, d is obtained. Regarding the relationship between each B quantity x of the crystal structure a ($Li_{7+2x}P_{1-x}B_xS_6$) included in the lithium-ion conductor and an ion conductivity, as illustrated in the upper drawing in FIG. 13, the ion conductivity tends to increase along with the increase in the B quantity x.

Regarding the ion conductivity of the lithium-ion conductor, although it depends on the kind and ratio of other crystal structures b, c, d included together with the crystal structure a, the increase in the ion conductivity is achieved by incorporating the crystal structure a containing B. Meanwhile, the ion conductivity of $Li_7PS_6$ not containing B is reported to be an order of $10^{-5}$ S/cm to $10^{-7}$ S/cm. A greater B quantity x to be incorporated of the crystal structure a tends to give a greater effect on the increase in the ion conductivity.

Hereinbefore, lithium-ion conductors are explained, and above-described lithium-ion conductors are applied, for example, to solid electrolytes of all-solid lithium-ion secondary batteries.

Figure 14:
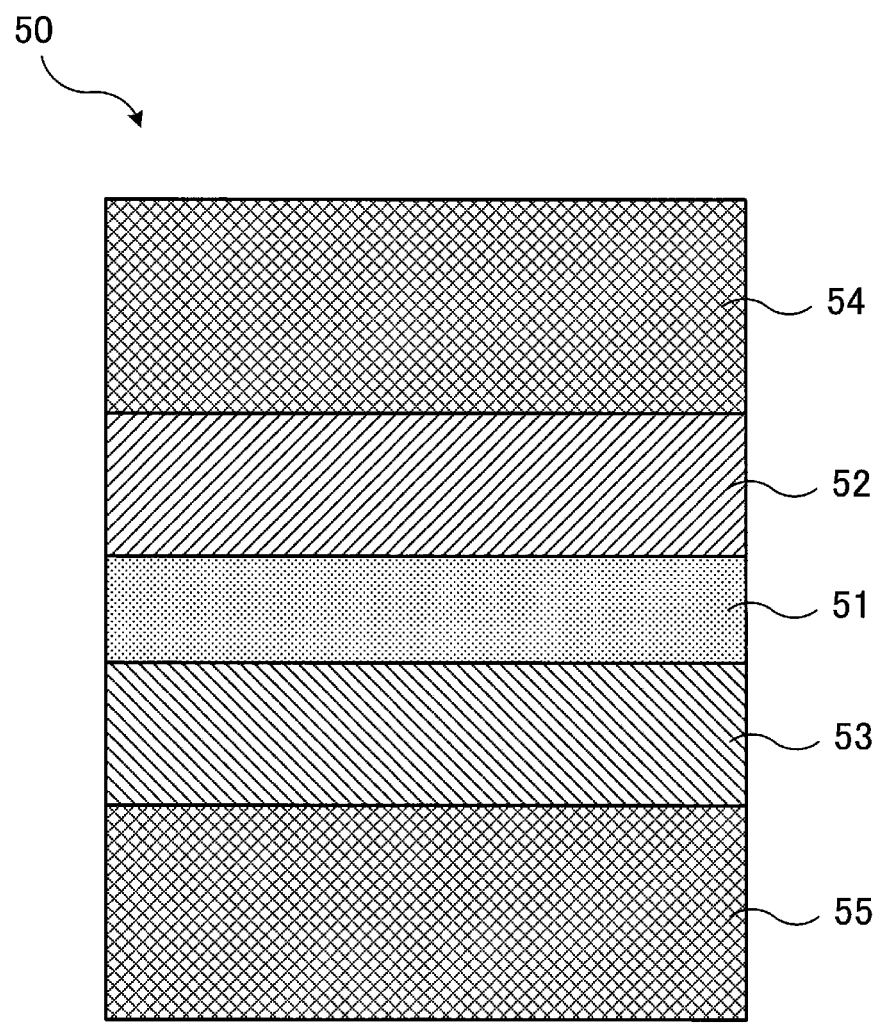
FIG. 14 illustrates an example of an all-solid lithium-ion secondary battery.

FIG. 14 illustrates an example of an all-solid lithium-ion secondary battery. In FIG. 14, a cross-section of the principal part of an example of the all-solid lithium-ion secondary battery is illustrated schematically.

An all-solid lithium-ion secondary battery 50 illustrated in FIG. 14 has a solid electrolyte 51, a positive electrode 52, a negative electrode 53, a positive electrode current collector 54 and a negative electrode current collector 55.

The solid electrolyte 51 is formed using the above-described lithium-ion conductor, that is, the lithium-ion conductor 10 of the crystal structure represented by the composition formula of $Li_{7+2x}P_{1-x}B_xS_6$ (0<x≤1), or a lithium-ion conductor including the crystal structure and another crystal structure. The positive electrode 52 and the negative electrode 53 are arranged so as to sandwich the solid electrolyte 51.

The positive electrode 52 contains such a positive electrode active material as lithium cobaltate ($LiCoO_2$). For the positive electrode 52, one obtained by mixing the positive electrode active material and the material of the solid electrolyte 51 (a lithium-ion conductor) at a prescribed ratio is used. For example, one obtained by mixing $LiCoO_2$ being a positive electrode active material and the material of the solid electrolyte 51 at a ratio of 6:4 is used.

The negative electrode 53 contains such a negative electrode active material as a lithium-aluminum (Li—Al) alloy. For the negative electrode 53, one obtained by mixing the negative electrode active material and the material of the solid electrolyte 51 (a lithium-ion conductor) at a prescribed ratio is used. For example, one obtained by mixing a Li—Al alloy being a negative electrode active material and the material of the solid electrolyte 51 at a ratio of 7:3 is used.

The positive electrode current collector 54 and the negative electrode current collector 55 are arranged on the positive electrode 52 and the negative electrode 53 as described above, respectively. For the positive electrode current collector 54 and the negative electrode current collector 55, materials having conductive property such as metal materials and carbon materials are used.

The all-solid lithium-ion secondary battery 50 is obtained, for example, by preparing each of the above-described solid electrolyte 51, positive electrode 52, negative electrode 53, positive electrode current collector 54 and negative electrode current collector 55 and stacking and integrating them in the order as in FIG. 14.

In the all-solid lithium-ion secondary battery 50, charge or discharge is performed in accordance with the voltage applied between the positive electrode 52 and the negative electrode 53, and lithium ions of the solid electrolyte 51 moves from the positive electrode 52 side to the negative electrode 53 side in the charge and moves from the negative electrode 53 side to the positive electrode 52 side in the discharge.

For an energy harvesting technology, in which electricity generated from minute energy such as sunlight, vibration and body heat of a human or an animal is stored and utilized for sensors and radio transmission power, a secondary battery that is safe and highly reliable under the entire global environment is needed. In lithium-ion secondary batteries using a liquid electrolyte, which are broadly utilized nowadays, when the cycle of charge and discharge is repeated, there are such anxieties that the positive electrode active material deteriorates and the lowering of battery capacity occurs, and an organic electrolyte in the battery catches fire by a short circuit caused by the formation of dendrite. Consequently, for the use for energy harvesting devices that are considered of utilization for such a long period of time as 10 years or longer, there is such possibility that sufficient reliability and safety is not obtained in the case of lithium-ion secondary batteries using a liquid electrolyte.

On the other hand, the all-solid lithium-ion secondary battery 50 using the above-described solid electrolyte 51 has such advantages that no fear of liquid leakage and firing exists, and that charge-discharge cycle characteristics are also excellent. In conventional all-solid lithium-ion secondary batteries, since the bulk impedance of a solid electrolyte is high and the solid electrolyte and the electrode are in a solid-to-solid contact, the internal resistance of batteries was high and, in some cases, a sufficient current could not be taken out. In contrast, in the above-described all-solid lithium-ion secondary battery 50, for the solid electrolyte 51 thereof, the lithium-ion conductor 10 of the crystal structure represented by the composition formula of $Li_{7+2x}P_{1-x}B_xS_6$ ($0<x \leq 1$), or a lithium-ion conductor including such a crystal structure is used. Consequently, it becomes possible to realize the all-solid lithium-ion secondary battery 50 that has a high ion conductivity of the solid electrolyte 51 and a low internal resistance, and that exhibits excellent output characteristics and excellent cycle characteristics.

Further, for the lithium-ion conductor used for the solid electrolyte 51 with high ion conductive property, the use of rare and expensive semimetal element such as Ge is unnecessary. Therefore, cost reduction of the solid electrolyte 51 and the all-solid lithium-ion secondary battery 50 using the same is achieved.

Furthermore, as a lithium-ion conductor used for the solid electrolyte 51, a material of the crystal structure of the composition formula of $Li_{7+2x}P_{1-x}B_xS_6$ ($0<x \leq 1$) is used, the composition not requiring a comparatively heavy element such as Ge or Se and, furthermore, substituting P by B being an element lighter than P. Consequently, it is possible to achieve weight saving of the solid electrolyte 51 and the all-solid lithium-ion secondary battery 50 using the same.

Meanwhile, regarding such lithium-ion conductors as described above, it is possible to know that a $PS_4$ tetrahedron and a $BS_4$ tetrahedron are contained by local structure analysis by Raman spectroscopy and crystal structure analysis by X-ray diffraction measurement. Further, it is possible to know the composition ratio of the crystal contained in the lithium-ion conductor by Inductively Coupled Plasma (ICP) analysis.

According to the disclosed technology, it becomes possible to realize a lithium-ion conductor that exhibits excellent ion conductive property. Further, by using this kind of lithium-ion conductor as a solid electrolyte, it becomes possible to realize an all-solid lithium-ion secondary battery that exhibits excellent battery characteristics.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A lithium-ion conductor comprising a crystal structure whose composition formula is represented by $Li_{7+2x}P_{1-x}B_xS_6$ ($0<x \leq 1$).

2. The lithium-ion conductor according to claim 1, wherein a space group of the crystal structure belongs to F-43m.

3. The lithium-ion conductor according to claim 2, wherein, when the crystal structure contains P, the crystal structure contains a $LiS_4$ tetrahedron in which Li is located at a center of a tetrahedron and S is located at four vertexes, a $PS_4$ tetrahedron in which P is located at a center of a tetrahedron and S is located at four vertexes and a $BS_4$ tetrahedron in which B is located at a center of a tetrahedron and S is located at four vertexes, in plural number respectively.

4. The lithium-ion conductor according to claim 3, wherein the crystal structure has a skeleton structure formed of the $PS_4$ tetrahedron and the $BS_4$ tetrahedron.

5. The lithium-ion conductor according to claim 3, wherein the crystal structure has a structure in which a pair of the $LiS_4$ tetrahedrons has two Ss in common.

6. The lithium-ion conductor according to claim 3, wherein the crystal structure has a structure in which the $LiS_4$ tetrahedron and the $BS_4$ tetrahedron have two Ss in common.

7. The lithium-ion conductor according to claim 3, wherein the crystal structure has a structure in which a vertex of the $PS_4$ tetrahedron and a vertex of the $BS_4$ tetrahedron point to the same direction in a unit lattice.

8. The lithium-ion conductor according to claim 1, further comprising a second crystal structure whose composition formula is $Li_3PS_4$ and whose space group belongs to Pnma.

9. The lithium-ion conductor according to claim 1, further comprising a third crystal structure whose composition formula is $Li_3PS_4$ and whose space group belongs to $Pmn2_1$, or a fourth crystal structure in which a part of Ps of the third crystal structure is substituted by B.

10. An all-solid lithium-ion secondary battery comprising:
    a solid electrolyte; and
    a pair of electrodes connected to the solid electrolyte,
    wherein the solid electrolyte includes a crystal structure whose composition formula is represented by $Li_{7+2x}P_{1-x}B_xS_6$ ($0<x \leq 1$).

11. The all-solid lithium-ion secondary battery according to claim 10, wherein a space group of the crystal structure belongs to F-43m.

12. The all-solid lithium-ion secondary battery according to claim 11, wherein, when the crystal structure contains P, the crystal structure contains a $LiS_4$ tetrahedron in which Li is located at a center of a tetrahedron and S is located at four vertexes, a $PS_4$ tetrahedron in which P is located at a center of a tetrahedron and S is located at four vertexes and a $BS_4$ tetrahedron in which B is located at a center of a tetrahedron and S is located at four vertexes, in plural number respectively.

13. The all-solid lithium-ion secondary battery according to claim 12, wherein the crystal structure has a skeleton structure formed of the $PS_4$ tetrahedron and the $BS_4$ tetrahedron.

14. The all-solid lithium-ion secondary battery according to claim 12, wherein the crystal structure has a structure in which a pair of the $LiS_4$ tetrahedrons has two Ss in common.

15. The all-solid lithium-ion secondary battery according to claim 12, wherein the crystal structure has a structure in which the $LiS_4$ tetrahedron and the $BS_4$ tetrahedron have two Ss in common.

16. The all-solid lithium-ion secondary battery according to claim 12, wherein the crystal structure has a structure in which a vertex of the $PS_4$ tetrahedron and a vertex of the $BS_4$ tetrahedron point to the same direction in a unit lattice.

17. The all-solid lithium-ion secondary battery according to claim 10, further comprising a second crystal structure whose composition formula is $Li_3PS_4$ and whose space group belongs to Pnma.

18. The all-solid lithium-ion secondary battery according to claim 10, further comprising a third crystal structure whose composition formula is $Li_3PS_4$ and whose space group belongs to $Pmn2_1$, or a fourth crystal structure in which a part of Ps of the third crystal structure is substituted by B.

* * * * *